US012670129B2

(12) United States Patent
Chen et al.

(10) Patent No.: US 12,670,129 B2
(45) Date of Patent: Jun. 30, 2026

(54) DATA STORAGE DEVICE AND STORAGE CONTROL METHOD BASED ON LOG-STRUCTURED MERGE TREE

(71) Applicants: HoneycombData Inc., Santa Clara, CA (US); HoneycombData (Nantong) Limited, Nantong (CN)

(72) Inventors: Yilun Chen, Nantong (CN); Meng Wang, Santa Clara, CA (US); Haibo Wu, Nantong (CN); Yu Zhang, Santa Clara, CA (US); Yunxiang Zhang, Nantong (CN); Xiangyong Ouyang, Santa Clara, CA (US)

(73) Assignees: HONEYCOMBDATA INC., Santa Clara, CA (US); HONEYCOMBDATA (NANTONG) LIMITED, Nantong (CN)

( * ) Notice: Subject to any disclaimer, the term of this patent is extended or adjusted under 35 U.S.C. 154(b) by 101 days.

(21) Appl. No.: 18/129,844

(22) Filed: Apr. 1, 2023

(65) Prior Publication Data

US 2024/0220460 A1     Jul. 4, 2024

(30) Foreign Application Priority Data

Dec. 30, 2022     (CN) ......................... 202211736351.X

(51) Int. Cl.
*G06F 16/185*     (2019.01)
*G06F 16/14*     (2019.01)

(52) U.S. Cl.
CPC .......... *G06F 16/185* (2019.01); *G06F 16/148* (2019.01)

(58) Field of Classification Search
CPC ............................ G06F 16/185; G06F 16/148
See application file for complete search history.

(56) References Cited

U.S. PATENT DOCUMENTS

| | | | | |
|---|---|---|---|---|
| 2022/0075552 | A1* | 3/2022 | Dayan ................. | G06F 16/2246 |
| 2022/0335027 | A1* | 10/2022 | Subramanian Seshadri ................ | |
| | | | | G06F 16/24573 |
| 2023/0153006 | A1* | 5/2023 | Zhang ................... | G06F 3/0659 |
| | | | | 711/154 |

FOREIGN PATENT DOCUMENTS

| | | | | | |
|---|---|---|---|---|---|
| CN | 112527804 | B | * | 9/2022 | ......... G06F 16/2246 |
| WO | WO-2019156309 | A1 | * | 8/2019 | ........... G06F 16/316 |

* cited by examiner

*Primary Examiner* — Aleksandr Kerzhner
*Assistant Examiner* — Samuel C Sharpless, III
(74) *Attorney, Agent, or Firm* — Treasure IP Group, LLC

(57) ABSTRACT

The present invention relates to a data storage device and a storage control method based on a log-structured merge tree. The log-structured merge tree comprises a plurality of SST files stored on at least one storage device. The storage control method uses a standardized storage unit to store key-value pairs and uses two different filters to locate the storage units storing the target key-value pair in the SST files, thereby saving memory usage and improving file IO efficiency.

13 Claims, 5 Drawing Sheets

S03: convert to an immutable memtable memory immutable memory table ⇐ memory table        S02: write to memtable S01: write to WALog S04: convert to an SST file

SSD  L0  SST    SST    SST    ⋯    SST

S05: compact low-level SST files into high-level SST files

L1  SST    SST    SST    ⋯    SST        LOG

L2  SST    SST    SST    ⋯    SST

PRIOR ART

SST File

| Data Blocks | Meta Blocks | Meta Index Block | Footer |

Data Blocks

| Data Block0 | Data Block1 | Data Block2 | Data Block3 | Data Block4 | ⋯ | ⋯ |

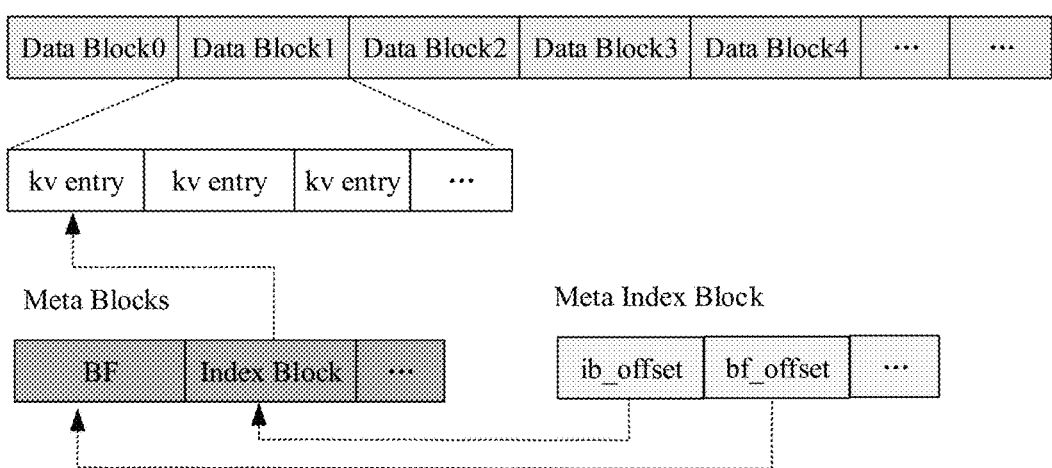

| kv entry | kv entry | kv entry | ⋯ |

Meta Blocks                                    Meta Index Block

| BF | Index Block | ⋯ |        | ib_offset | bf_offset | ⋯ |

FIG.2

PRIOR ART

SST File
| Data Segement | Meta Segment | BF | Footer |
Data Segment
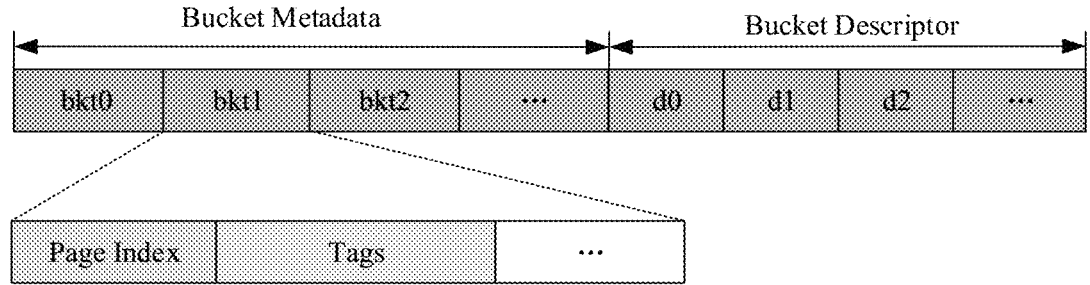
Meta Segment
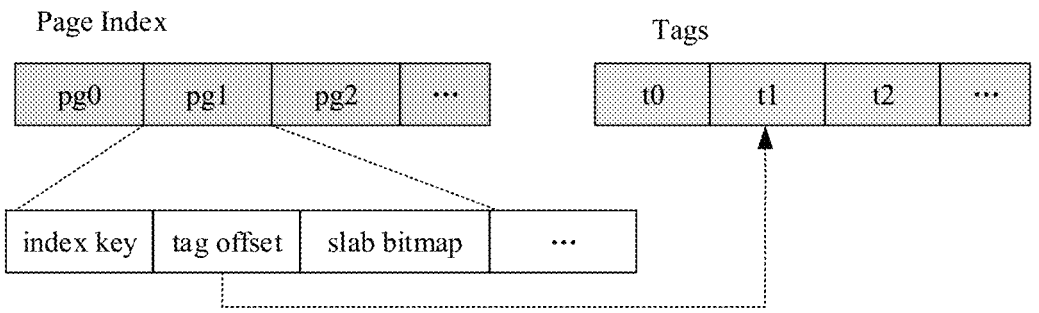
Page Index                                    Tags
| pg0 | pg1 | pg2 | ... |        | t0 | t1 | t2 | ... |
| index key | tag offset | slab bitmap | ... |
FIG.3

10

1

DATA STORAGE DEVICE AND STORAGE CONTROL METHOD BASED ON LOG-STRUCTURED MERGE TREE

CROSS-REFERENCE TO RELATED APPLICATION

The present application claims priority to a Chinese Patent Application No. 202211736351.X, entitled "Data storage device and storage control method based on log-structured merge tree", filed on Dec. 30, 2022, the entire contents of which is incorporated herein by reference in its entirety.

TECHNICAL FIELD

The present disclosure relates to the technical field of data storage, and more specifically, to a data storage device and a storage control method based on a log-structured merge tree.

BACKGROUND

Solid State Drive (SSD) is a type of storage device made of solid-state memory chips, and mainly comprises controllers, storage media, and cache chips. At present, most mainstream Solid State Drives use flash memory, i.e., non-volatile memory such as NAND flash memory, as the storage medium to store data.

With the rapid improvement of SSD performance, SSDs have also been widely used in storage servers in the past few years. On a storage server using SSDs, the read and write latency for 4 KB pages can be less than 10 microseconds. However, existing key-value storage engines, such as RocksDB, perform file I/O synchronously to read key-value pairs. The calling thread must wait for the file I/O to complete, triggering a context-switch in the operating system. Compared with the low latency of SSD, the context switch of the operating system takes non-neglectable time, thus degrading the storage performance.

In order to meet the demand for high-density storage, a large number of SSDs can be installed on the storage server, and each SSD can provide more than 1 million IOPS.

With the development of storage technology, the performance and storage density of SSDs can be continuously improved. However, due to the limit of Moore's Law, CPU performance is difficult to improve. Therefore, key-value stores should be designed to provide high performance with limited CPU resources. In order to support a larger number of SSDs, existing solutions use more CPUs or CPUs with more cores, and use multiple processor cores to perform read and write operations on multiple SSD storage devices, thereby reducing read and write delays. However, a multi-channel mechanism based on multiple processors is not a cost-effective approach.

SUMMARY OF THE INVENTION

In view of the above problems, the purpose of the present disclosure is to provide a data storage device and a storage control method based on a log-structured merge tree, wherein a standardized storage unit is used to store key-value pairs, and two different filters are used to locate a target key within a file, thus it can save memory usage and improve file IO efficiency.

According to a first aspect of the present disclosure, a storage control method based on a log-structured merge tree is provided. The log-structured merge tree comprises a plurality of Sorted String Table (SST) files stored on at least one storage device, and the storage control method comprises the following: in the data segments of the plurality of SST files, using a standardized storage unit to store a plurality of key-value pairs; in the metadata segments of the plurality of SST files, establishing a first filter and a second filter; using the first filter to obtain the SST file which contains the target key; using the second filter to obtain the location of the storage units which stores the target key; and according to the location of the storage units, performing file IO operations on the SST files to obtain the query result.

Preferably, the data segments of the plurality of SST files respectively include a plurality of continuous data buckets, and each data bucket comprises at least one continuous data page.

Preferably, the size of the data page is the same as the physical page size of the storage device.

Preferably, the at least one data page respectively comprises at least one continuous data slab, and the at least one data slab has a fixed size and serves as the standardized storage unit.

Preferably, the plurality of key-value pairs are respectively stored in at least one continuous data slab, and the starting positions of the plurality of key-value pairs are aligned with the slab size.

Preferably, the first filter is a bloom filter, and the second filter is a tag filter.

Preferably, the tag filter comprises tags of the plurality of key-value pairs, and the tags are the hash values of the keys of the plurality of key-value pairs.

Preferably, the tags of the plurality of key-value pairs respectively occupy memory space of a fixed size.

Preferably, in the metadata segments of the plurality of SST files, the key-value pairs stored in the data segments of the plurality of SST files are indexed in a hierarchical manner according to data buckets, data pages, and data slabs.

Preferably, the metadata segments of the plurality of SST files respectively include a bucket metadata area and a bucket descriptors area, and a bucket descriptor is used to describe the starting position and size of the corresponding bucket's metadata in the bucket metadata area.

Preferably, the bucket metadata area comprises a page index area and a tag area, and tags of the plurality of key-value pairs are stored in the tag area.

Preferably, the steps of obtaining the location of the storage units which may store the target key by using the second filter comprise: calculating a hash value of the target key to obtain the bucket ID; performing binary search on the page index area in the bucket metadata area to obtain a page ID; and performing tag matching on the tag area to obtain the starting data slab IDs and the number of data slabs.

Preferably, the steps further comprise: during the process of opening a database, preloading the metadata segments of the plurality of SST files of the database into the memory.

Preferably, before using the target key for SST file matching, the steps further comprise: searching for the key-value pairs matching the target key in at least one of a memory table and an immutable memory table.

According to a second aspect of the present disclosure, a data storage device is provided, including: a plurality of SSD storage devices on which a plurality of SST files are stored; a processor and memory, wherein the processor is used for executing instructions to perform the following steps: in the data segments of the plurality of SST files, using a standardized storage unit to store a plurality of key-value pairs;

in the metadata segments of the plurality of SST files, establishing the first filter and the second filter; using the first filter to obtain the SST files which contain the target key; using the second filter to obtain the location of the storage units which store the target key; and according to the location of the storage units, performing file IO operations on the matching SST files to obtain the query result.

In the data storage system according to the embodiments of the present disclosure, two different filters are established in the SST file. The first filter is, for example, a bloom filter in the SST file, and is used to indicate whether the SST file possibly contains the target key. The second filter is, for example, a tag filter in the SST file, which is used to indicate the locations of the data slabs which stores the target key in the plurality of SST files.

In this embodiment, the metadata segments of SST files index the key-value pairs stored in the data segments of the plurality of SST files in a hierarchical manner according to data buckets (labeled as Bucket in the drawings), data pages (labeled as Page in the drawings), and data slabs (labeled as Slab in the drawings). If the query key matches the tag (labeled as Tag in the drawings), then based on the tag offset and the data slab bitmap, the starting data slab ID and the number of data slabs matching the target key can be calculated.

During the data reading operation, the metadata segment (labeled as Meta Segment in the drawings), the bloom filter (labeled as BF in the drawings), and the footer (labeled as Footer in the drawings) of the SST file may be preloaded into the memory. Therefore, this file loading method does not need to load the entire content of the SST file, which can save a lot of memory space. Even if the memory space of the data storage system is limited, the index data of a plurality of SST files can be loaded into the memory, and the read and write operations of multiple SSD storage devices can be executed in parallel in a data storage system with limited CPU resources.

Furthermore, according to the bloom filter of the SST file, check whether the target key is contained in the SST file. According to the page index Page Index and tag (label Tag in the drawings) in the metadata segment, the data slab of the key-value pair in the SST file can be located based on memory operations, so as to achieve accurate positioning within the file with data slab level accuracy. In the file IO operations, only the content related to the specific data slab (label Slab in the drawings) needs to be read, so the file IO efficiency can be improved.

DESCRIPTION OF DRAWINGS

The above and other objectives, features, and advantages of the present disclosure will be more apparent through the following description of the embodiments of the present disclosure with reference to the accompanying drawings.

FIG. 1 shows a schematic block diagram of a data storage system based on a log-structured merge tree.

FIG. 2 shows a schematic diagram of a data structure of an SST file in a data storage system according to the prior art.

FIG. 3 shows a schematic diagram of a data structure of an SST file in a data storage system according to an embodiment of the present disclosure.

DESCRIPTION OF DETAIL EMBODIMENTS

Figure 4:
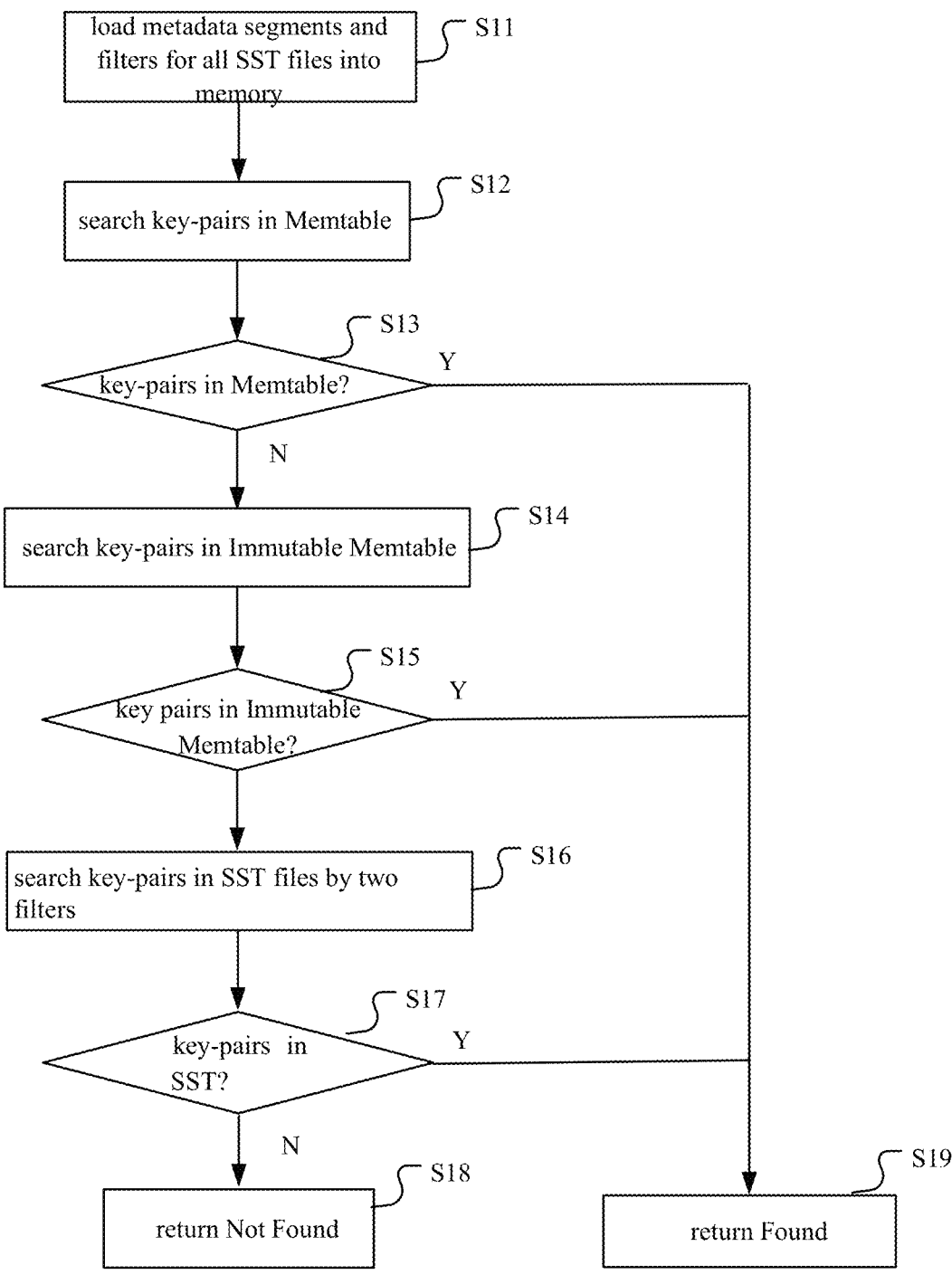
FIG. 4 shows a schematic flowchart of a storage control method according to an embodiment of the present disclosure.

The present disclosure will be described in more detail below with reference to the accompanying drawings. In each drawing, identical elements are indicated with similar reference numerals. For the sake of clarity, the parts in the drawings have not been drawn to scale. Also, some well-known parts may not be shown.

The present disclosure is described below based on embodiments, but the present disclosure is not limited only to these embodiments. In the following detailed description of the disclosure, some specific details are set forth in detail. The present disclosure can be fully understood by those skilled in the art without the description of these details. Well-known methods, processes, procedures, elements, and circuits have not been described in detail so as not to obscure the essence of the present disclosure.

FIG. 1 shows a schematic block diagram of a data storage system based on a log-structured merge tree.

Key-value database is an important database type. Compared with traditional relational databases, key-value databases use keys to identify data rows, and not limited to fixed data table structures, thus saving time and space overhead, and reducing the number of disk reads and writes to improve performance.

Key-value databases can be implemented using the log-structured merge tree (LSM-Tree). Data storage systems based on the log-structured merge tree include RocksDB, and LevelDB, etc. Taking RocksDB as an example, as shown in FIG. 1, the data storage system based on the log-structured merge tree includes a memory layer and a persistence layer.

In the memory layer, key-value pairs can be stored in a memory table (Memtable) and an immutable memory table (Immutable Memtable), and the two together form a structure for organizing and maintaining data in memory. In the persistence layer, key-value pairs are stored in data files (for example, Sorted String Tables (SSTs)) in multiple levels. The persistence layer is put on hardware with persistency such as SSDs.

The memory layer and the persistence layer of the data storage system jointly maintain the data storage of key-value pairs. When writing a key-value pair, the key-value pair is first stored in the memory layer, and when the storage space in the memory reaches a predetermined threshold, the key-value pairs in the memory layer are transferred to the persistence layer to form a data file.

Furthermore, in the persistence layer, if the quantity or the size of the L0-level SST files reaches a predetermined threshold, the L0-level SST files will be merged and sorted to form the L1-level SST files. Furthermore, the L1-level SST files may be merged into L2-level SST files, thereby forming multiple levels of SST files. The merging process of the SST files is also called Compaction.

Therefore, the latest data are stored in the memory layer, and relatively new data are stored in the SST files of a lower level (for example, L0 level) in the persistent layer.

Referring to FIG. 1, when a data update request (such as Put, Update, Delete operation) is received, the data writing process performed by the data storage system includes steps S01 to S04.

In step S01, before the data are written into the memory table, the key-value pair is written into a write-ahead log (WriteAheadLog, WAL).

In step S02, the data are written into memory table Memtable.

In step S03, if the data size of memory table Memtable reaches a predetermined threshold (for example, 64 MB), then the memory table Memtable is closed and converted into an immutable memory table Immutable Memtable. Meanwhile, a new memory table is created to respond to new data update requests.

In step S04, after step S03, initiate a background task immediately, the key-value pairs in the immutable memory table Immutable Memtable are transferred to an SST file, written to an SSD storage device, thereby the memory data are written to the SST file for persistence. The above file storage operation in step S04 is also referred to as Flush. After Flush, the system releases the resources occupied by Immutable Memtable.

In step S05, the SST files in a lower level are compacted into the SST files in a higher level. For example, when the total size of SST files at a certain level exceeds a predetermined threshold (the threshold of SST files at each level can be different, and the threshold of SST files at a higher level can be several times the threshold of SST files at a lower level), then the SST files are merged and converted into one SST file, and stored as a higher-level SST file. This file merging process is also called Compaction.

When receiving a read operation (for example Get operation), the data query process that the data storage system carries out comprises accessing the memory table Memtable and then the immutable memory table Immutable Memtable in the memory layer. If a match to the target key cannot be found in memory, locate the SST files through the SST Info Cache maintained in the memory, and meanwhile use the filters corresponding to the SST files to determine whether the target key is possible in the SST files. If the target key is in the SST file, then perform file IO operations on the SST files to read the file content, to obtain the matching key-value pair as the query result. In the read operation, the query result may be first obtained from the SST files of a lower level (for example, L0 level). If there is no matching data in the SST files up to the highest level (for example, Ln level), it means that there is no matching key-value pair in either the memory layer or the persistence layer.

The data storage system based on the log-structured merging tree uses SST files to realize persistent storage. SST files not only contain the data themselves, but also metadata, which includes filters, for example. The filters of the SST files are used to determine whether the target key is contained in the SST files. Example filters include Bloom Filter and Quotient Filter, etc.

The data storage system based on the log-structured merge tree can realize the following characteristics in a read operation: if there are multiple matching results in the data storage system, then the read operation should read the latest matching result.

FIG. 2 shows a schematic diagram of the data structure of an SST file in a data storage system according to the prior art.

In the data storage system according to the prior art, the SST file includes multiple blocks Block. The size of each block is fixed, for example, it is configured to be the same as the page size of the SSD storage device, for example, 4 KB. Taking RocksDB as an example, as shown in FIG. 2, the SST file includes multiple data blocks (labeled as Data Blocks in the drawings), multiple metadata blocks (labeled as Meta Blocks in the drawings), and metadata index block (labeled as Meta Index Bock in the drawings).

The data blocks (labeled as Data Blocks in the drawings) of the SST file are used to store all key-value pairs. In each data block, for example, multiple key-value pairs are stored in a contiguous manner. The metadata blocks Meta Blocks of the SST file are used to store metadata. For example, the metadata blocks (labeled as Meta Blocks in the drawings) include the bloom filter BF constructed based on all key-value pairs in the SST file, and the index keys of the data blocks Data Block. The metadata index block Meta Index Block of the SST file is used to store the index information of the metadata blocks, for example, the number of the metadata blocks, the offset of the index blocks, the offset of the bloom filter, etc.

In addition, the SST file also includes a Footer, which describes additional information of the SST file.

In order to perform read operations, one method is to preload the metadata of the SST files into the memory. And for each SST file, according to the bloom filter in the metadata, check whether the target key is contained in the SST file, and then perform file IO operations to read the data blocks of the SST file. However, the file IO operations can only provide a rough positioning of the Data Block within the file, which degrades the efficiency of the file IO.

In order to perform read operations, another method is to preload the metadata of SST file and key-value pairs in memory. And for each SST file, according to the bloom filter in the metadata, check whether the target key is contained in the SST file, and perform in-memory data operations to read the data blocks of the SST file. However, this file loading method consumes a large amount of memory space. Due to the limitation of the memory space of the data storage system, it is difficult to execute read and write operations of multiple SSD storage devices in parallel in a data storage system.

FIG. 3 shows a schematic diagram of a data structure of an SST file in a data storage system according to an embodiment of the present disclosure.

In the data storage system according to an embodiment of the present disclosure, an SST file includes a plurality of segments (labeled as Segment in the drawings). As shown in FIG. 3, the SST file includes a data segment (labeled as Data Segment in the drawings), a metadata segment (labeled as Meta Segment in the drawings), a bloom filter BF and a footer. When opening the database, the metadata segment (labeled as Meta Segment in the drawings) and the bloom filter (labeled as BF in the drawings) of the SST file can be loaded into the memory in advance, so they are resident in the memory.

The data segment Data Segment of the SST file includes multiple data buckets (labeled as Bucket in the drawings). Furthermore, each data bucket (labeled as Bucket in the drawings) includes at least one continuous data page (labeled as Page in the drawings), and each data page (labeled as Page in the drawings) includes at least one continuous data slab (labeled as Slab the drawings).

In this embodiment, the size of the data bucket (labeled as Bucket in the drawings) is not fixed, that is, the number of data buckets (labeled as Bucket in the drawings) is proportional to the number of data pages (labeled as Page in the drawings), and the data pages (labeled as Page in the drawings) and the data slabs (labeled as Slab in the drawings) are standardized storage units with a fixed size. Preferably, the size of the data page (labeled as Page in the drawings) of the SST file is the same as the physical page size of the SSD storage device, for example, 4 KB, and the size of the data slab (labeled as Slab in the drawings) of the SST file is set to a predetermined value, for example, 64B. Therefore, the size of the data page (labeled as Page in the drawings) and the data slab (labeled as Slab in the drawings) of the SST file is fixed, and each data page (labeled as Page in the drawings) can include 64 data slabs (labeled as Slab in the drawings).

In this embodiment, in the data segment (labeled as Data Segment in the drawings) of an SST file, the size of key-value pairs are variable, therefore, the storage space size of multiple key-value pairs is also variable. In this embodiment, the storage space of each key-value pair occupies at least one data slab (labeled as Slab in the drawings), and the starting position of the storage space of the key-value pair is aligned with the data slab (labeled as Slab in the drawings). Therefore, if the storage space of the key-value pair occupies multiple continuous data slabs (labeled as Slab in the drawings), the last data slab (labeled as Slab) may be padded.

The metadata segment (labeled as Meta Segment in the drawings) of the SST file includes Bucket Meta Data and Bucket Descriptor. For each data bucket (labeled as Bucket in the drawings) in the data segment (labeled as Data Segment in the drawings) of the SST file, there is a corresponding bucket metadata bkti and a bucket descriptor di in the metadata segment (labeled as Meta Segment in the drawings) of the SST file, where i represents the i-th data bucket (labeled as Bucket in the drawings).

In this embodiment, the bucket metadata (labeled as Bucket in the drawings) includes the page indices (labeled as Page Index in the drawings) of multiple data pages (labeled as Page in the drawings) in the data segment (labeled as Data Segment in the drawings) and tags (labeled as Tag in the drawings) of multiple key-value pairs. The bucket descriptor (labeled as Bucket Descriptor in the drawings) is used to describe the starting position and size of the corresponding bucket's metadata (labeled as Bucket in the drawings) in the metadata segment (labeled as Meta Segment in the drawings).

For example, the page index (labeled as Page Index in the drawings) is an index struct related to the data page (labeled as Page in the drawings). The tag (labeled as Tag in the drawings) is, for example, a hash value calculated according to the key (for example, the size is 1 B). For each data page (labeled as Page in the drawings) in the data segment (labeled as Data Segment in the drawings) of the SST file, a corresponding index struct is reserved in the metadata segment (labeled as Meta Segment in the drawings) of the SST file and stored in the page index area (labeled as Page Index in the drawings).

The index struct includes an index key, a tag offset, and a data slab bitmap. The index key is the key of the first key-value pair in the data page (labeled as Page in the drawings), (in principle, the index key only needs to satisfy the requirement: index key>=all keys in page or index key<=all keys in page) and is used for binary search. The tag offset refers to the offset in the tag area of the tag corresponding to the first key-value pair in the data page. The data slab bitmap describes whether each data slab (labeled as Slab in the drawings) in the data page (labeled as Page in the drawings) is the starting point of a new key-value pair.

In the data storage system according to an embodiment of the present disclosure, two different filters are established in the SST file. The first filter is, for example, a bloom filter in the SST file, and is used to indicate whether the SST file contains the target key. The second filter is, for example, a tag filter in the SST file, which is used to indicate the location of the data slabs which stores the target key-value pair.

In the present embodiment, the key-value pairs stored in the data segments of the plurality of SST files are indexed in a hierarchical manner according to data buckets (labeled as Bucket in the drawings), data pages (labeled as Page in the drawings), and data slabs (labeled as Slab in the drawings). If the target key matches the tag (labeled as Tag in the drawings), then based on the tag offset and the data slab bitmap, the starting data slab IDs and the number of data slabs matching the target key can be calculated.

In order to perform a read operation, the metadata segment Meta Segment, the Bloom filter BF, and the footer (labeled as Footer in the drawings) of an SST file can be preloaded into the memory. Therefore, this file loading method does not need to load the entire content of the SST file, which can save a lot of memory space. Even if the memory space of the data storage system is limited, the index data of multiple SST files can be loaded into the memory, and the read and write operations of multiple storage devices can be executed in parallel in a data storage system.

Furthermore, according to the bloom filter BF of the SST file, determine whether the target key is contained in the SST file. According to the page index (Page Index) and tag (Tag) in the metadata segment, based on the memory operations, the data slab of the key-value pair in the SST file can be located, so as to achieve accurate positioning within the file with data slab level accuracy. In the file IO operations, only the content related to the specific data slabs Slab needs to be read, so the file IO efficiency can be improved.

FIG. 4 shows a schematic flowchart of a storage control method according to an embodiment of the present disclosure. The storage control method includes a plurality of steps S11 to S19 related to a data reading operation.

In a data storage system, a read operation includes searching in the memory layer and the persistence layer of the data storage system in turn, so as to obtain the query result that matches the target key. The query result is, for example, a key-value pair data matching the target key.

In step S11, when a database is opened, the metadata segments and filters of all the SST files in the data storage system are loaded into the memory.

The data storage system according to the embodiment of the present disclosure uses standardized storage units to store key-value pairs, and uses two different filters to realize the positioning of the storage units of the target key in the SST files.

The metadata segments of the SST files index the key-value pairs stored in the data segments of the plurality of SST files in a hierarchical manner according to data buckets, data pages, and data slabs. Therefore, loading the metadata segments and bloom filters of the SST files in memory can significantly reduce the required memory space compared to directly loading the data segments of the SST files.

When the data storage system has an appropriate total memory and total SSD space configuration, the memory space is sufficient to store the metadata segments and bloom filters of all the SST files. That is, in the storage control method according to the embodiment of the present disclosure, the metadata segments and filters of all the SST files in the data storage system reside in memory and are used as index data, without additional reading from the SSD storage devices.

In the data storage system based on the log-structured merge tree, the Update operations include the data writing process of the memory layer and the persistence layer. In a dynamic update operation, a key-value pair with different versions may be stored in both the memory table Memtable and the immutable memory table Immutable Memtable in the memory layer and the SST files in the persistence layer of the data storage system. The key-value pairs in the memory table Memtable are always the latest data. Therefore, in the read operations, key-value pairs are searched in turn in the memory table Memtable and the immutable memory table Immutable Memtable in the memory layer, and the SST files in the persistence layer.

In step S12, search key-value pair in the memory table Memtable.

In step S13, check whether a key-value pair is found. If a key-value pair is found, step S19 is executed, and the query result is returned. If no key-value pair is found, execute step S14.

In step S14, search key-value pair in the immutable memory table Immutable Memtable.

In step S15, check whether a key-value pair is found. If a key-value pair is found, step S19 is executed, and the query result is returned. If no key-value pair is found, execute step S16.

In step S16, use two different filters to search the key-value pair in the SST files.

In step S17, check whether a key-value pair is found. If a key-value pair is found, step S19 is executed, and the query result is returned. If no key-value pair is found, step S18 is executed, and search failure information is returned.

According to the storage control method of an embodiment of the present disclosure, the steps of a read operation use two different filters preloaded into the memory, wherein the first filter is a bloom filter of the SST file, and the second filter is a tag filter in the metadata segment of the SST file. According to the bloom filter BF of the SST file, check whether the target key is contained in the SST file. According to the tag filter in the metadata segment, the data slabs of the key-value pair in the SST file can be located based on memory operations, so as to achieve accurate positioning within the file with data slab level accuracy. In the file IO operations, only the content related to the specific data slabs (labeled as Slab in the drawings) needs to be read, so the file IO efficiency can be improved.

Figure 5:
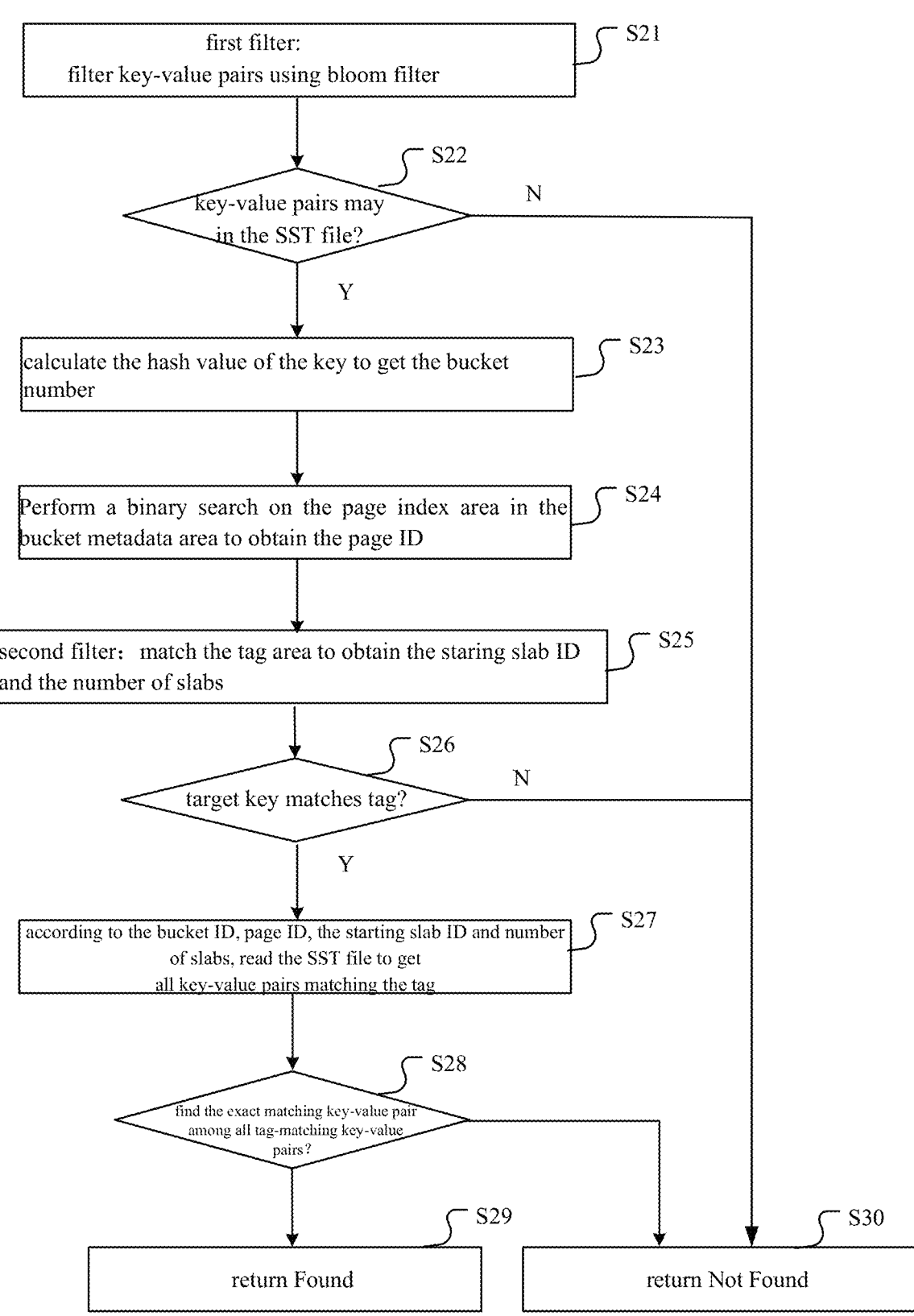
FIG. 5 shows a detailed flowchart of searching within a file using two different filters in the storage control method shown in FIG. 4.

FIG. 5 shows a detailed flow chart of using two different filters to search within a file in the storage control method shown in FIG. 4.

According to the storage control method of the embodiment of the present disclosure, the metadata segments, and filters of all the SST files in the data storage system reside in memory. For all the SST files, a traversal search is performed, for example, steps S21 to S30 shown in FIG. 5 are repeated until a query result matching the target key is obtained, then the file traversal is stopped. A detailed flow chart of searching within an SST file will be described below with reference to FIG. 5.

In step S21, the first filter is used to filter SST files. In this embodiment, the first filter is a bloom filter in the SST file. According to the bloom filter, it can be checked whether the target key is contained in the SST file.

In step S22, check whether the key-value pair is contained in the SST file according to the query result of the bloom filter. If the key-value pair is contained in the SST file, step S23 is executed. If it is impossible for the key-value pair to be contained in the SST file, step S30 is performed, and search failure information is returned.

In step S23, calculate the hash value of the target key to obtain the bucket ID of the data bucket in the SST file.

In step S24, according to the bucket ID of the data bucket, performs a binary search in the page index area (labeled as Page Index in the drawings) in the bucket metadata area of the SST file to obtain the page ID.

The search process is based on the index key (labeled as Index Key in the drawings) of the data page, and the query key is compared with the index key to determine the data page where the target key may be located.

In step S25, the second filter is used to filter the SST files. In this embodiment, the second filter is a tag filter in the SST file. In-file positioning of the target key can be achieved based on the tag filter.

The positioning process is based on the tag area in the metadata segment of the SST file, which compare the target key with multiple tags in the tag area to determine the data slab where the target key may be located. The hash values of the keys of all the key-value pairs in the SST file are stored in the tag field.

Because different key-value pairs in the SST file may have the same hash value, the key-value pair matching based on the tag filter may match multiple key-value pairs, and multiple data slabs matching the target key may be obtained. Furthermore, by obtaining the tag offset and the data slab bitmap according to the page index (labeled as Page Index in the drawings) in the SST file, the data slab IDs and the number of data slabs of multiple key-value pairs can be obtained.

In step S26, check whether the target key matches the tags of the SST file. If the target key matches the tags of the SST file, step S27 is executed. If the target key does not match the tags of the SST file, step S30 is executed, and search failure information is returned.

In step S27, according to the file slab positioning, file IO operations are performed on the SST file to read the key-value pairs in the data segment of the SST file.

The file reading step includes reading the SST file to obtain all the key-value pairs matching the target key according to the bucket ID, page ID, data slab ID and the number of data slabs.

In step S28, according to the key-values pair read, perform key matching. If the target key matches the key-value pairs of the SST file, step S29 is executed to return the query result. If the target key does not match the key-value pairs of the SST file, step S30 is executed, and search failure information is returned.

Figure 6:
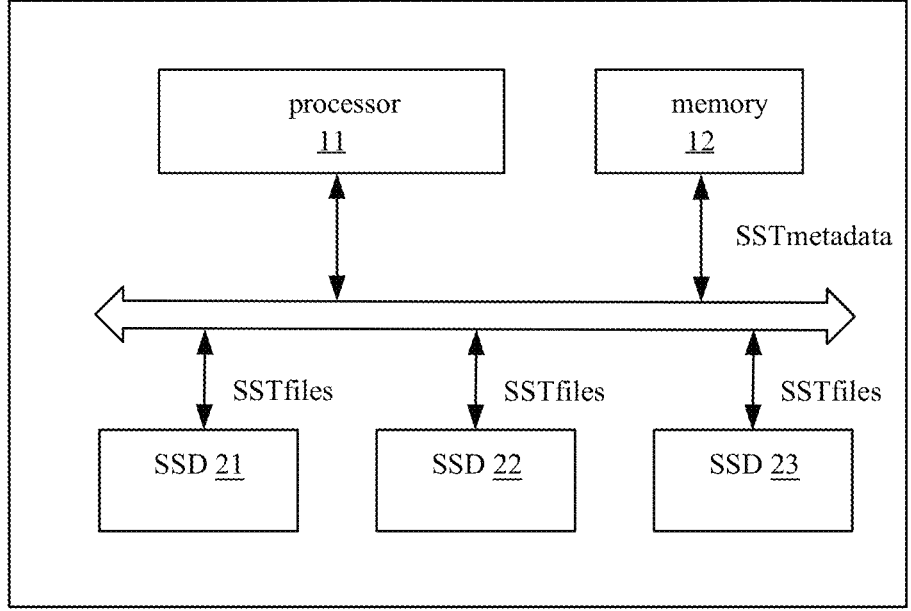
FIG. 6 shows a schematic block diagram of a data storage device according to an embodiment of the present disclosure.

FIG. 6 shows a schematic block diagram of a data storage device according to an embodiment of the present disclosure.

Referring to FIG. 6, it is a schematic diagram of a data storage device provided by an embodiment of the present application. The data storage device 10 includes a processor 11, a memory 12, and SSD storage devices 21 to 23. On the SSD storage devices 21 to 23, a plurality of SST files are stored in the form of a log-structured merge tree. During the operation of the data storage device, the data storage device 10 loads computer-readable instructions into the memory 12 and can run the computer-readable instructions on the processor 11, such as a storage control program based on the log-structured merge tree. When the processor 11 executes the computer-readable instructions, the steps in the above said embodiment of the storage control method based on the log-structured merge tree are implemented.

Those skilled in the art can understand that FIG. 6 is only an example of the data storage device 10, and does not constitute a limitation to the data storage device 10, and may include more or fewer components than those shown in the illustration, or combine certain components, or different components, for example, the data storage device 10 may also include input and output devices, network access devices, and buses, etc.

The processor 11 can be Central Processing Unit (CPU), other general-purpose processors, Digital Signal Processor (DSP), Application Specific Integrated Circuit (ASIC), Field-Programmable Gate Array (FPGA) or other programmable logic devices, discrete gate or transistor logic devices, and discrete hardware components, etc. The general-purpose processor can be a microprocessor or the processor 11 can also be any conventional processor, etc., and the processor 11 is the control center of the data storage device 10, and uses various interfaces and connections to connect various parts of the entire data storage device 10.

The memory 12 can be used for storing computer-readable instructions, and processor 11 realizes the functions of the data storage device 10 by running or executing computer-readable instructions or modules stored in the memory 12, and using the data stored in the memory 12. The memory 12 can mainly include a program storage area and a data storage area, wherein the program storage area can store an operating system, at least one application program required by a function (such as a sound playback function, an image playback function, etc.); the data storage area can store data created due to the use of the data storage device 10, etc. Furthermore, the memory 12 may include hard disk, internal memory, plug-in hard disk, Smart Media Card (SMC), Secure Digital (SD) card, flash memory card (Flash Card), at least one magnetic disk storage device, flash memory device, Read-Only Memory (ROM), Random Access Memory (RAM), or other non-volatile/volatile storage devices.

If the integrated modules of the data storage device 10 are implemented in the form of software function modules and sold or used as independent products, they can be stored in a computer-readable storage medium. Based on this understanding, the present application realizes all or part of the processes in the methods of the above embodiments, and can also be implemented by computer-readable instructions or related hardware. The computer-readable instructions can be stored in a computer-readable storage medium. When the computer readable instructions are executed by the processor, the steps in the method of the above embodiments can be realized. Wherein, the computer-readable instructions include computer-readable instruction codes, and the computer-readable instruction codes may be in the form of source code, object code, executable file, or some intermediate form. The computer readable medium may include: any entity or device capable of carrying computer readable instruction code, recording medium, USB disk, removable hard drive, magnetic disk, optical disk, computer memory, ROM, and RAM, etc.

The present embodiment also provides a kind of computer storage medium, and computer instructions are stored in this computer storage medium. When these computer instructions run on an electronic device, they make the electronic device carry out the relevant method steps and realize the storage control method based on the log-structured merge trees in the above embodiments.

The present embodiment also provides a computer program product, when the computer program product runs on an electronic device, the electronic device performs the related steps, so as to realize the storage control method based on the log-structured merge tree in the above said embodiments.

Furthermore, the embodiment of the present application also provides a type of device, and this device can specifically be chip, component, or module, and this device can comprise connected processor and memory; wherein the memory is used for storing computer-executable instructions. During device operation, the processor can execute the computer-executable instructions stored in the memory, so that the chip executes the storage control method based on the log-structured merge tree in the above embodiments.

Wherein the electronic device, computer storage medium, and computer program product or chip provided by the present embodiment are all used to carry out the above said method. Therefore, its achievable benefits can refer to the benefits of the corresponding methods provided above, and they will not be repeated here.

Through the description of the above embodiments, those skilled in the art can clearly understand that for the convenience and simplicity of description, the division of the above-mentioned functional modules is only used for illustration, and in practical applications, the above function implementation can be accomplished with different functional modules, that is, the internal structure of the device is divided into different functional modules to complete all or part of the functions described above.

From the several embodiments provided in this application, it should be understood that the disclosed device and method can be realized in other ways. For example, the device embodiments described above are only illustrative. For example, the division of the modules or units is only a logical function division. In actual implementation, there may be other division methods. For example, multiple units or components can be combined or it can be integrated into another device, or some features can be omitted, or not implemented. Besides, the mutual coupling or direct coupling or communication shown or discussed may be through some interfaces, and the indirect coupling or communication connection of devices or units may be in electrical, mechanical, or other forms.

The units described as separate components may or may not be physically separated, and the components shown as units may be a physical unit or a plurality of physical units, which may be located in one place, or may be distributed to multiple different places. Part or all of the units can be selected according to actual needs to achieve the purpose of the method of this embodiment.

Furthermore, each functional unit in each embodiment of the present application may be integrated into one processing unit, or each unit may exist separately physically, or two or more units may be integrated into one unit. The integrated units can be implemented in the form of hardware or in the form of software functional units.

If the integrated unit is realized in the form of a software functional unit and sold or used as an independent product, it can be stored in a readable storage medium. Based on this understanding, the technical solution of the embodiment of the present application is essentially or the part that contributes to the prior art, or all or part of the technical solution can be embodied in the form of a software product, and the software product is stored in a storage medium, including that multiple instructions are used to make a device (which may be a single-chip microcomputer, a chip, etc.) or a processor execute all or part of the steps of the methods described in the various embodiments of the present application. The aforementioned storage media include: USB drive, mobile hard drive, Read-Only Memory (ROM), Random Access Memory (RAM), magnetic disk, optical disk, and other media that can store program codes.

Embodiments according to the present disclosure are described above, which do not describe all the details, nor do they limit the invention to the specific embodiments described. Obviously, many modifications and variations are possible in light of the above description. This description selects and specifically describes these embodiments in order to better explain the principles and practical applications of the present disclosure, so that those skilled in the art can make good use of the present disclosure and its variations based on the present disclosure. The present disclosure is to be limited only by the claims, along with their full scope and equivalents.

The invention claimed is:

1. A storage control method based on a log-structured merge tree, said log-structured merge tree comprising a plurality of SST (Sorted String Table) files stored on at least one storage device, said storage control method comprising:

using continuous data slabs to store a plurality of key-value pairs in data segments of the plurality of SST files, wherein the data segments of the plurality of SST files respectively comprises a plurality of continuous data buckets, and each data bucket comprises a plurality of continuous data page, wherein each of the at least one data page comprises at least one continuous data slab;

establishing, in metadata segment of each the plurality of SST files, a file filter and tag filter;

using the file filter to obtain the plurality of SST files match a query key;

using the tag filter to obtain a location of data slabs that matches the query key; and performing file IO (Input Output) operations on the plurality of SST files matched the query key, to obtain query results, according to the location of the data slabs;

wherein the tag filter includes multiple tags of a multiple key-value pairs, where the multiple tags are hash values of keys of the multiple key-value pairs, and the location of the data slabs includes matching the tags in the tag section to obtain sequence numbers and quantities of the data slabs corresponding to the multiple key-value pairs.

2. The storage control method according to claim 1, wherein a size of the data page is equal to a fixed physical page size of a storage device.

3. The storage control method according to claim 1, wherein each data slab has a fixed size, order of magnitude smaller than a size of the page and serves as the standardized storage unit.

4. The storage control method according to claim 3, wherein a plurality of key-value pairs are respectively stored in the at least one continuous data slab, and the starting positions of the plurality of key-value pairs are aligned to the slab size.

5. The storage control method according to claim 3, wherein the file filter is a bloom filter, or a quotient filter.

6. The storage control method according to claim 5, wherein the tags of the plurality of key-value pairs respectively occupy memory spaces of a fixed size.

7. The storage control method according to claim 3, wherein the key-value pairs stored in the data segments of the plurality of SST files are indexed in a hierarchical manner in the metadata segments of the plurality of SST files according to data buckets, data pages, and data slabs.

8. The storage control method according to claim 7, wherein the metadata segments of the plurality of SST files respectively comprise a bucket metadata area and a bucket descriptors area, and bucket descriptors are used to describe start positions and the sizes of a plurality of data buckets.

9. The storage control method according to claim 8, wherein the bucket metadata area comprises a page index area and a tag area, and the tags of the plurality of key-value pairs are stored in the tag area.

10. The storage control method according to claim 5, wherein the steps of using the tag filter to obtain the location of the data slabs matching the target key comprise:

calculating a hash value of the target key to obtain a bucket ID;

performing a binary search on the page index area in the bucket metadata area to obtain a page ID; and performing tag matching on the tag area to obtain starting data slab IDs and the quantity of the data slabs.

11. The storage control method according to claim 1, further comprises: during the process of opening a database, preloading the metadata segments of the plurality of SST files of the database into the memory.

12. The storage control method according to claim 1, before using the target key to match the SST files, further comprises: searching for key-value pairs matching the target key in at least one of a memory table and an immutable memory table.

13. A data storage device comprising:

a plurality of SSD storage devices, storing a plurality of SST files;

a processor and memory, wherein, the processor is used to execute instructions to perform the steps of:

using continuous data slabs to store a plurality of key-value pairs, in data segments of the plurality of SST files, wherein the data segments of the plurality of SST files respectively comprises a plurality of continuous data buckets, and each data bucket comprises a plurality of continuous data page, wherein each of the at least one data page comprises at least one continuous data slab;

establishing a file filter and a tag filter, in metadata segments of the plurality of SST files;

obtaining an SST file by using the file filter;

obtaining a location of the data slabs storing the target key using the tag filter; and performing file IO operations on the matching SST files to obtain the query result, according to the location of the storage units.

* * * * *